(12) United States Patent
Ban et al.

(10) Patent No.: US 6,250,094 B1
(45) Date of Patent: Jun. 26, 2001

(54) AIR CONDITIONING SYSTEMS

(75) Inventors: Takashi Ban; Toshiro Fujii; Takanori Okabe; Takayuki Imai, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/411,091

(22) Filed: Oct. 4, 1999

(30) Foreign Application Priority Data

Oct. 5, 1998 (JP) .................................................. 10-283118

(51) Int. Cl.[7] ................................. F25B 1/00; B60H 1/03
(52) U.S. Cl. ......................................... 62/228.3; 62/228.5
(58) Field of Search .............................. 62/228.3, 323.1, 62/217, 228.1, 228.5, 196.4, 159, 197, 226, 210, 229, 324.6

(56) References Cited

U.S. PATENT DOCUMENTS

| | | | |
|---|---|---|---|
| 4,687,419 | * 8/1987 | Suzuki et al. ........................ | 417/222 |
| 4,709,555 | * 12/1987 | Kawai et al. ....................... | 62/228.3 |
| 4,780,059 | * 10/1988 | Taguchi ............................... | 417/222 |
| 5,201,189 | * 4/1993 | Yokomachi et al. ............... | 62/196.3 |
| 5,823,000 | * 10/1998 | Takai ................................... | 62/133 |

FOREIGN PATENT DOCUMENTS

| | | |
|---|---|---|
| 5-223357 | 8/1993 | (JP) . |
| 7-19630 | 1/1995 | (JP) . |
| 10-47242 | 2/1998 | (JP) . |

* cited by examiner

Primary Examiner—Harry B. Tanner
(74) Attorney, Agent, or Firm—Morgan & Finnegan, LLP

(57) ABSTRACT

An air conditioning system 100 may include a cooling circuit 151, a heating circuit 152 and a variable displacement compressor 101 as a driving source for both the heating and cooling circuits and may be utilized in a vehicle-mounted air conditioning system. In such case, the driving shaft 125 of the compressor 101 is connected to and driven by a car engine 170. In order to decrease the compressor output discharge capacity during an abnormally high pressure state, high-pressure refrigerant in the discharge chamber 120 is released into the driving chamber 110 to increase the driving chamber pressure. The high-pressure refrigerant can be released from the discharge chamber 120 into the driving chamber 110 utilizing a variety of different structures.

9 Claims, 5 Drawing Sheets

AIR CONDITIONING SYSTEMS

BACKGROUND OF THE INVENTION

1. Technical Field

The present invention relates to air conditioning systems that utilize refrigerants and a compressor, and particularly to air conditioning systems capable of alleviating excessive increases in refrigerant discharge pressure within a heating circuit.

2. Description of the Related Art

A known air conditioning system is disclosed in Japanese Patent Application No. 7-19630 and includes a compressor 1, a cooling circuit 51, a heating circuit 52 and a controller 83, as shown in FIG. 1. The cooling circuit 51 includes a condenser 55, a first expansion valve 57 and a heat exchanger 59 provided on a passage connecting a discharge port D to a suction port S of the compressor 1. High pressure refrigerant discharged from the discharge port D of the compressor 1 is drawn through the above respective devices and back to the compressor 1.

The heating circuit 52 includes a bypass passage 52a extending from the discharge port D of the compressor 1 to the heat exchanger 59. A second expansion valve 63 provided within the bypass passage 52a between the discharge port D and the heat exchanger 59. The high pressure refrigerant discharged from the compressor 1 is not directed to the condenser 55, but rather is drawn by the compressor 1 through the second expansion valve 63 and the heat exchanger 59. Such a heating circuit 52 is generally known as a hot gas bypass heater.

The operation of the cooling circuit 51 and the heating circuit 52 is changeably selected by opening and closing selector valves 53a and 53b, which opening and closing operations are performed by the controller 83.

Because the refrigerant discharge pressure is higher when the heating circuit 52 is used than when the cooling circuit 51 is used, the air conditioning system must operate in a high pressure state when the heating circuit 52 is utilized. An abnormally high-pressure state may be created if the output discharge capacity of the compressor 1 temporarily increases during the operation of the heating circuit 52. A refrigerant releasing passage 91 having a pressure relief valve 93 is provided in order to release excess pressure from the heating circuit 52, if an abnormally high pressure state is reached. The refrigerant releasing passage 91 is connected to the heating circuit 52 and the cooling circuit 51 and the pressure relief valve 93 can be opened to release the refrigerant from the heating circuit 52 into the cooling circuit 51 when the refrigerant discharge pressure abnormally increases during the operation of the heating circuit 52.

Because the cooling circuit 51 and the heating circuit 52 are alternatively selected by the selector valves 53a and 53b, the refrigerant is released into the cooling circuit 51 which is not used in operation of the heating circuit 52, thereby preventing the discharge pressure at the heating circuit 52 from increasing abnormally.

However, because the refrigerant in the heating circuit 52 is released into the cooling circuit 51 whenever the discharge pressure abnormally increases, the amount of refrigerant in the heating circuit 52 is reduced and heating performance may be reduced. Moreover, because the high pressure refrigerant is wastefully released from the heating circuit, energy efficiency is reduced.

SUMMARY OF THE INVENTION

It is an object of the present invention to provide an air conditioning system that can alleviate abnormally high pressure states more efficiently.

Preferably, an air conditioning system may include a compressor having a driving chamber, a heating circuit and a controller. This system may release abnormally high pressure refrigerant from the compressor discharge port into the compressor driving chamber in accordance with differences between the refrigerant discharge pressure discharged from the compressor and refrigerant suction pressure at the compressor suction port or the refrigerant pressure within the driving chamber. By increasing the pressure within the driving chamber, the compressor discharge capacity can be reduced. As a result, the discharge pressure of the compressor will be reduced by the reduction in the compressor discharge capacity. Because the abnormally high pressure refrigerant is conserved within the compressor by such operation, refrigerant is not wastefully released into a cooling system. Furthermore, because the abnormally high pressure refrigerant is actually utilized to decrease the system pressure to normal operating pressure levels, the heating performance and efficiency of the system can be improved over known air conditioning systems.

The controller may be influenced by pressure differences within the compressor to thereby simplify the airtight structure of a valve that permits the refrigerant to be released into the compressor driving chamber.

Other objects, features and advantages of the present invention will be readily understood after reading the following detailed description together with the accompanying drawings and the claims.

DETAILED DESCRIPTION OF THE INVENTION

Figure 1:
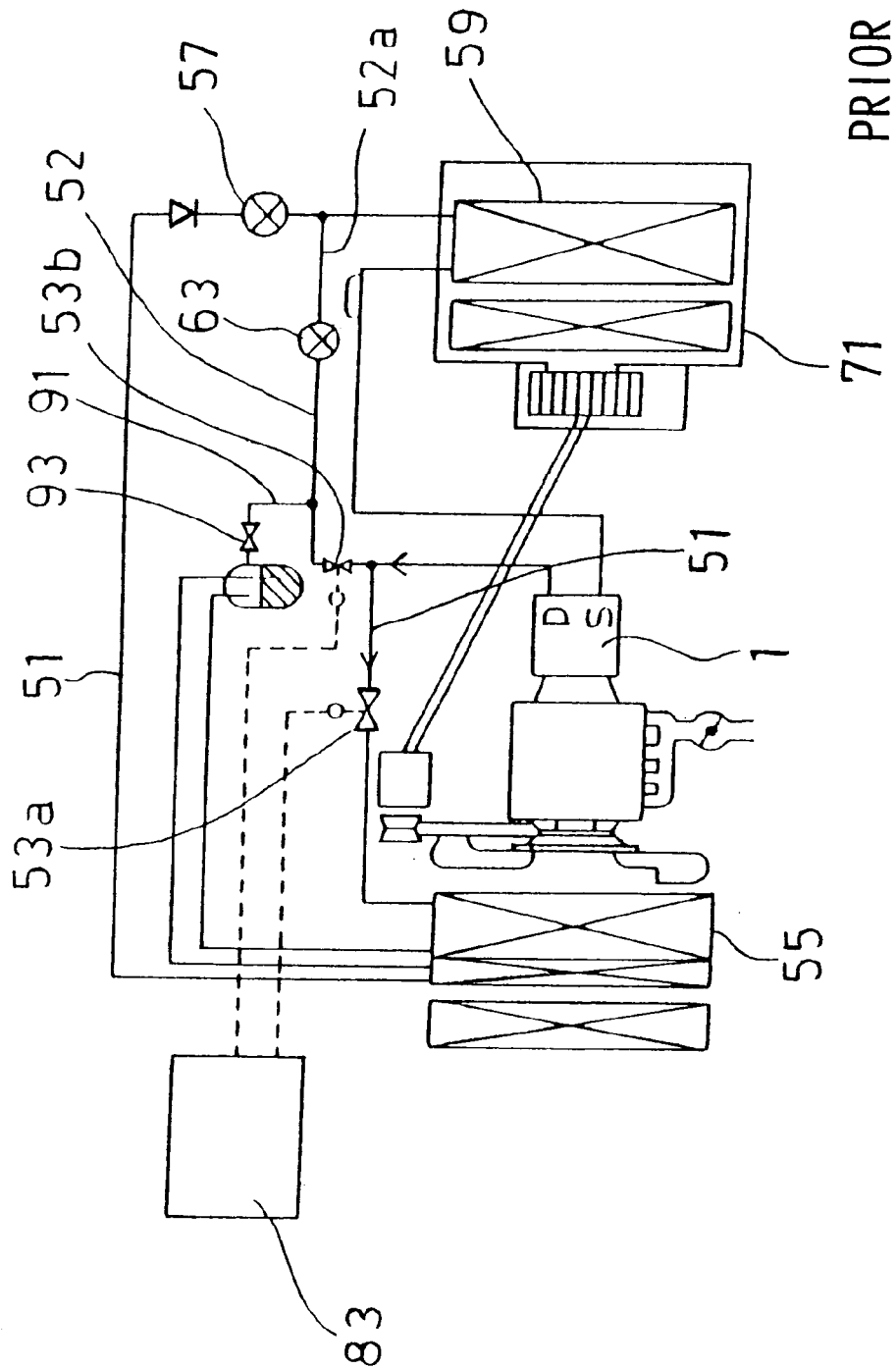
FIG. 1 shows a known air conditioning system.

Preferably, an air conditioning system includes a compressor, a heating circuit and a controller. The compressor may have a driving chamber, a suction port and a discharge port for discharging high pressure refrigerant from the compressor. The high pressure refrigerant also can be released from the discharge port into the driving chamber in order to change the output discharge capacity of the compressor. The heating circuit may have a bypass passage that extends from the discharge port to a heat exchanger and through the heat exchanger. The controller may cause the abnormally high pressure refrigerant to be released into the driving chamber in accordance with differences between the refrigerant discharge pressure and the refrigerant suction pressure or the refrigerant pressure within the driving chamber.

According to this example, by releasing the compressed refrigerant from the discharge port into the driving chamber, the compressor output discharge capacity is reduced, if the compressor output discharge pressure is in an abnormally high-pressure state according to the difference between the discharge pressure (high pressure side) and either the suction pressure or the driving chamber pressure (low pressure side). By detecting pressure differences in this manner, the suction pressure is not increased immediately in response to an increase in the discharge pressure and the driving chamber pressure is not affected by an increase in the discharge pressure.

According to this example, because only pressures detected within the air conditioning system are utilized to determine whether abnormal high pressure refrigerant will be released into the driving chamber, atmospheric pressure is not used as an index to determine the discharge pressure state. Therefore, an air tight air conditioning system can be constructed with a relatively simple design.

When determining the pressure differences within the system, either the refrigerant suction pressure or the driving chamber pressure can be used as the low-pressure side. When the above pressure difference is increased, the system determines that the refrigerant discharge pressure has reached a predetermined high-pressure state. Therefore, the refrigerant is released from the discharge port into the driving chamber to suppress the high-pressure state.

Preferably, changes in the compressor output discharge capacity are utilized to decrease the refrigerant discharge pressure, especially during operation of the heating circuit. Because the pressure of the refrigerant is higher during operation of the heating circuit than during operation of the cooling circuit, an upper limit tolerance level for the discharge pressure becomes closer. The abnormally high-pressure state can occur even by a slight increase in the discharge pressure. Therefore, it is necessary to tightly control the discharge pressure during the operation of the heating circuit, more so than during operation of a cooling circuit, which also may be provided with a capacitor disposed on a path extending from the discharge port to the suction port. A heat exchanger may be disposed downstream from the capacitor.

The controller also may have a capacity changing passage that extends from the discharge port to the driving chamber. A capacity control valve may be disposed within the capacity changing passage and may be opened by an increased pressure difference between the refrigerant discharge pressure and either the refrigerant suction pressure or the driving chamber pressure. As a result, the output discharge capacity changing passage is opened to connect the discharge port and the driving chamber and the refrigerant is released from the discharge port (high-pressure side) into the driving chamber (the low-pressure side). The increased pressure within the driving chamber can decrease the compressor output discharge capacity and thereby decrease the refrigerant discharge pressure.

Each of the additional features and method steps disclosed above and below may be utilized separately or in conjunction with other features and method steps to provide improved air conditioning systems and methods for designing and using such air conditioning systems. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

First Detailed Representative Embodiment

Figure 2:
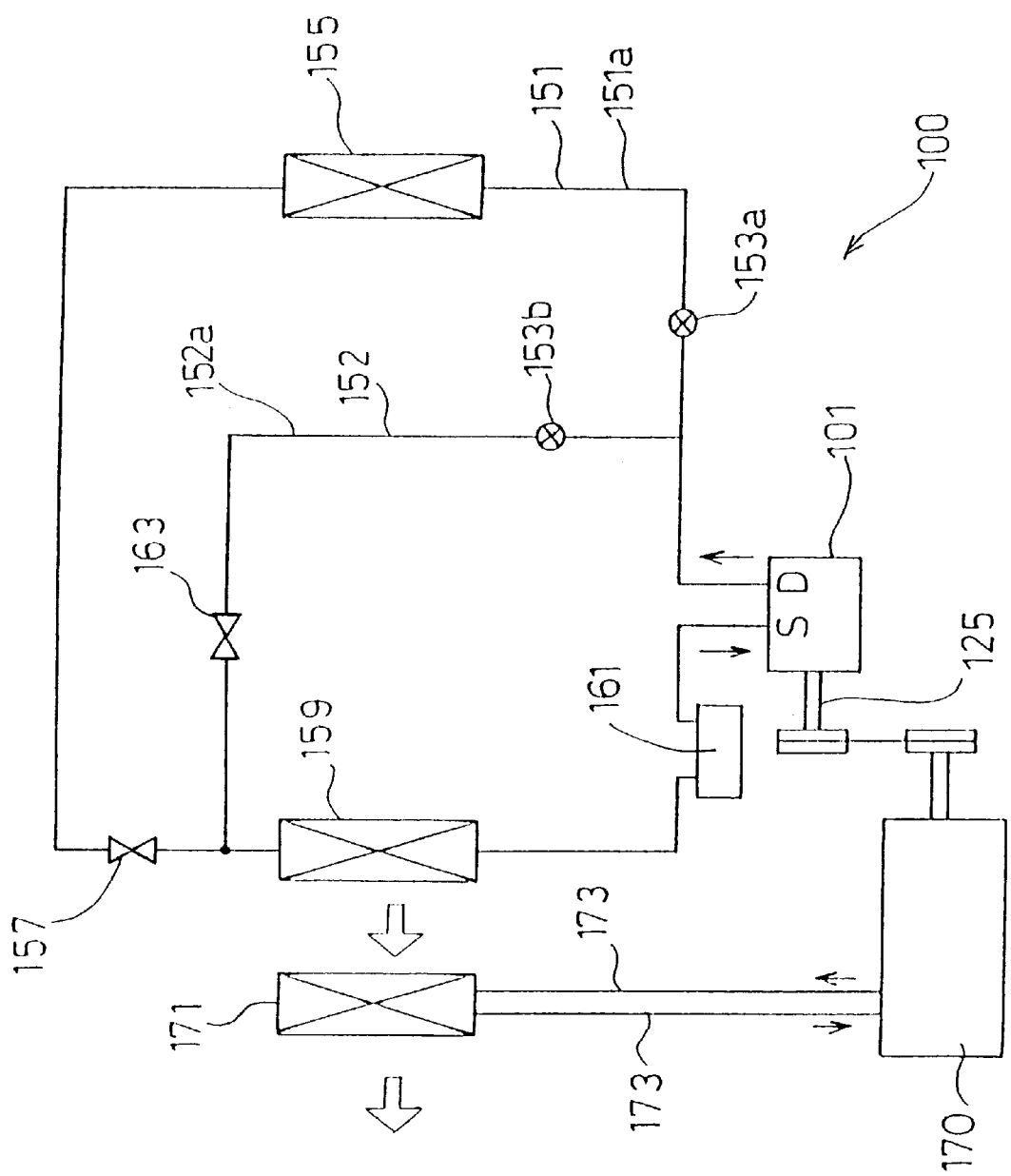
FIG. 2 shows an air conditioning system according to a first representative embodiment.
Figure 3:
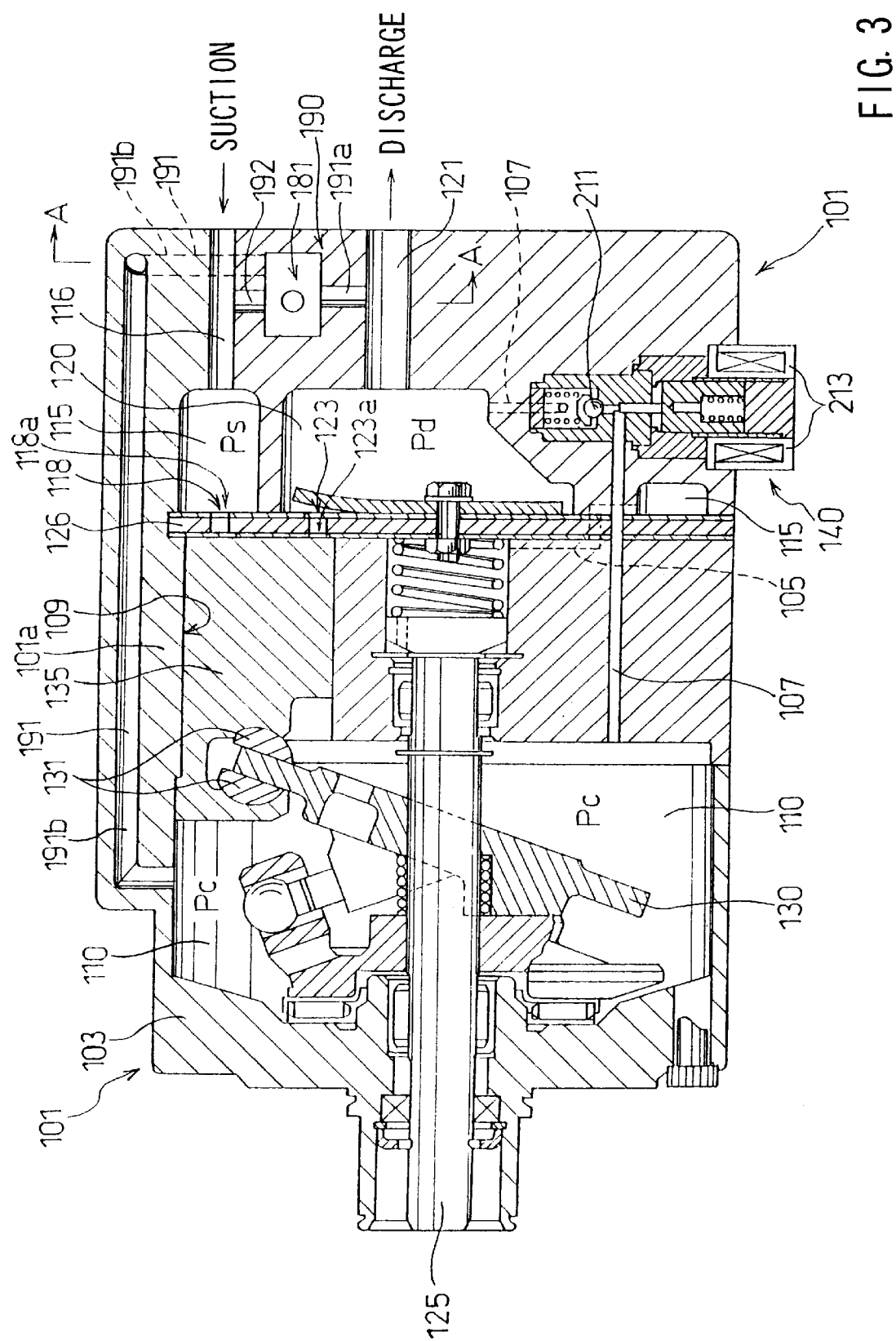
FIG. 3 shows a compressor and controller for the air conditioning system according to the first representative embodiment.
Figure 4:
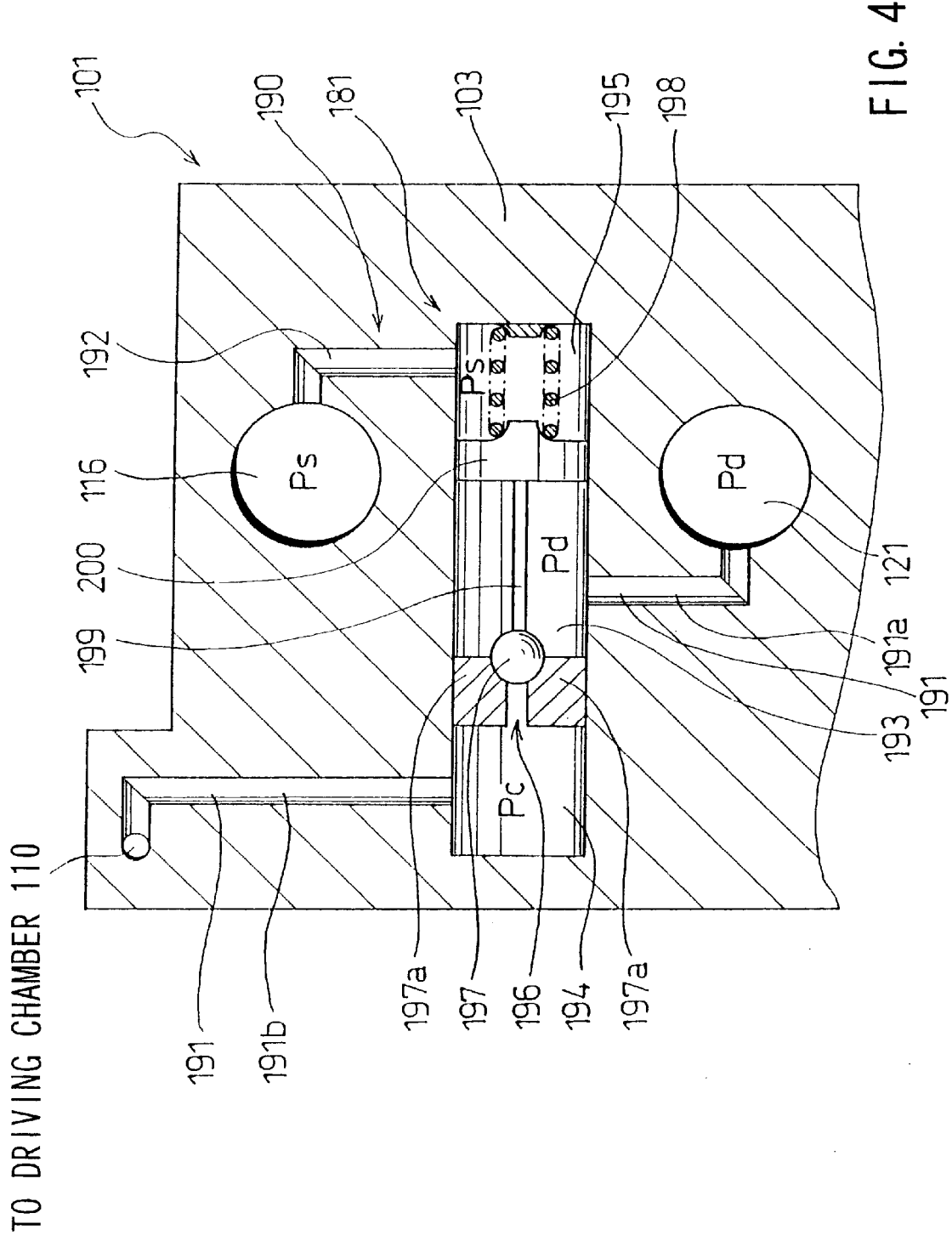
FIG. 4 is a sectional view taken along a line A—A in FIG. 3.

Referring to FIG. 2, the air conditioning system 100 may include a cooling circuit 151, a heating circuit 152 and a variable displacement compressor 101 as a driving source for both the heating and cooling circuits. A representative controller is shown in FIGS. 3 and 4, but is not shown in FIG. 2 for the sake of convenience and will be described below in further detail. Such an air conditioning system 100 may be utilized in a vehicle-mounted air conditioning system. In such case, the compressor driving shaft 125 may be coupled to and driven by an automobile engine 170.

The cooling circuit 151 may be driven by high-pressure refrigerant, which is compressed by the compressor 101, and may include a capacitor 155, a first expansion valve 157, a heat exchanger 159 and an accumulator 161. These devices may be disposed within a path 151a that extends from a discharge port D to a suction port S of the compressor 101. The heat exchanger 159 is also generally known as an evaporator. The heat exchanger 159 may be arranged side by side with a hot-water heater 171, which circulates hot coolant from the engine 170 through a pipe 173.

The heating circuit 152 is driven by high-temperature and high-pressure refrigerant, which is also compressed by the compressor 101, and may include a second expansion valve 163, the heat exchanger 159 and the accumulator 161. These devices may be disposed on a bypass passage 152a for introducing the refrigerant discharged from the discharge port D to the heat exchanger 159. In other words, the heating circuit 152 partially overlaps with the cooling circuit 151. Such a heating circuit 152 is also generally known as a hot-gas bypass heater.

In FIG. 2, a first open/close valve 153a and a second open/close valve 153b may be utilized as switch valves for alternatively actuating the cooling circuit 151 and the heating circuit 152.

During operation of the cooling circuit 151, the refrigerant is compressed by the compressor 101 to attain a high temperature and high pressure state. This compressed refrigerant is sent to the capacitor 155, where heat from the high-temperature refrigerant is dissipated to the outside environment and the refrigerant is liquefied. The refrigerant is decompressed by the first expansion valve 157 and sent to the heat exchanger 159 where the refrigerant absorbs outside heat and is gasified. The gasified refrigerant is returned to the compressor 101 again through the accumulator 161 for re-circulation throughout the system 100.

During operation of the heating circuit 152, the refrigerant is compressed by the compressor 101 to attain a high temperature and high pressure state. The compressed refrigerant is then decompressed by the second expansion valve 163 and sent to the heat exchanger 159, where heat from the compressed refrigerant is dissipated to the outside environment. In the heating circuit cycle, the refrigerant is constantly in a gaseous state while circulating through the heating circuit 152.

The heating circuit 152 may be used as an auxiliary heater. Heat generated by the heat exchanger 159 during operation of the heating circuit 152 may be used as an auxiliary heating source for the hot water heater 171. The heating circuit 152 also may be used to assist the coolant from the engine 170 when the coolant can not provide sufficient heat to start the engine 170 in a low-temperature environment, such as an outside air temperature of −20° C. or so.

Referring to FIG. 3, a representative compressor 101 is shown that may include a driving chamber 110 defined within a housing 101a of the compressor 101 and a swash plate 130 that is rotatably supported by the driving shaft 125 in the driving chamber 110. The swash plate 130 may be supported by the driving shaft 125 and may rotate together with the drive shaft 125. The swash plate 130 is inclined with respect to the driving shaft 125 when the driving shaft 125 rotates and the inclination angle of the swash plate 130 with respect to a plane perpendicular to the axis of rotation of the driving shaft 125 is changeable.

The peripheral edge portion of the swash plate 130 may be connected to the base portions of the pistons 135 by means of movable shoes 131. Six pistons 135 in total may be disposed around the driving shaft 125 (however, only one piston is shown in FIG. 3 for the sake of convenience) and may be laterally slide within six cylinder bores 109. The circumferential positions of the six cylinder bores 109 fixed by the compressor housing 101a.

When the swash plate 130 rotates together with the driving shaft 125 while being inclined as shown in FIG. 3, the peripheral edge of the swash plate 130 slides with respect to the piston 135 fixed in the circumferential direction. When the peripheral edge of the swash plate 130 being inclined to a position closest to the cylinder bores 109 is position in the piston (as shown in FIG. 3), the piston 135 reaches its deepest insertion into the cylinder bores 109. When the peripheral edge of the swash plate 130 (the peripheral edge shown in a lower part of FIG. 3) being inclined to a position furthest away from the cylinder bores 109, the piston 135 is substantially withdrawn from the cylinder bore 109. Each 360° rotation of the driving shaft 125 results in each piston 135 laterally reciprocating one time.

A suction port 118a and a discharge port 123a are defined in a bottom portion of each the cylinder bore 109. A suction valve 118 is positioned to correspond to the suction port 118a and a discharge valve 123 is positioned to correspond to the discharge port 123a. Each suction port 118a communicates with a suction chamber 115 and each the discharge port 123a communicates with a discharge chamber 120.

When the piston 135 moves to the left in FIG. 3, as a result of rotation of the swash plate 130, refrigerant is introduced from the suction opening 116 through the suction chamber 115, suction port 118a and suction valve 118 into the cylinder bore 109. When the piston 135 moves to the right in FIG. 3, as a result of further rotation of the swash plate 130, the refrigerant is compressed into a high-pressure state and discharged from a discharge opening 121 through the discharge port 123a, discharge valve 123 and discharge chamber 120.

The output discharge capacity of the compressor 101 is determined by the stroke length of the piston 135, which is determined by the degree of change in inclination angle of the swash plate 130 during each cycle. That is, the further the swash plate 130 is withdrawn from the cylinder bore 109 during each cycle, the longer the stroke length of the piston 135 will be. As the stroke length increases, the output discharge capacity of the compressor 101 also increases.

The inclination angle of the swash plate 130 is determined, in part, by the difference in pressure on the opposite sides of the piston 135, i.e., the pressure difference between driving chamber pressure and the cylinder bore pressure. Increasing or decreasing the driving chamber pressure can adjust this pressure difference.

Thus, in order to decrease the output discharge capacity, the high-pressure refrigerant is released from the discharge chamber 120 into the driving chamber 110. Due to resulting increasing in the driving chamber pressure, the swash plate 130 stands and the stroke length of the piston 135 decreases. Therefore, the output discharge capacity also will decrease. On the other hand, in order to increase the output discharge capacity, the refrigerant in the discharge chamber 120 is prevented from being released into the driving chamber 110. As a result, the driving chamber pressure will gradually decrease, the swash plate 130 will move further in the lateral direction and the stroke length of the piston 135 will increase. In this case, the output discharge capacity will increase.

The high-pressure refrigerant can be released from the discharge chamber 120 into the driving chamber 110 utilizing a variety of different structures. As shown in FIG. 3, for example, the suction chamber 115 and the driving chamber 110 are connected by a bleeding passage 105 at all times. The discharge chamber 120 and the driving chamber 110 are connected by a heating discharge capacity changing passage 191 and a cooling discharge capacity changing passage 107. A heating capacity control valve 181 may be provided at a position within the heating capacity changing passage 191.

A detailed discharge capacity controller is shown in FIG. 4, which is a sectional view taken along line A—A in FIG. 3. The discharge opening 121 and the driving chamber 110 are connected within the compressor housing 101a by the heating capacity changing passage 191. The heating capacity control valve 181 is provided at a position within the heating capacity changing passage 191. The suction opening 116 and the heating capacity control valve 181 are connected by a pressure difference passage 192.

In the heating capacity control valve 181, the discharge opening 121 is connected to a first section chamber 193 through a first passage 191a. Therefore, pressure in the first section chamber 193 is equal to the discharge pressure Pd. The driving chamber 110 is connected to a second section chamber 194 through a second passage 191b. Therefore, pressure in the second section chamber 194 is equal to driving chamber pressure Pc. The suction opening 116 is connected to a third section chamber 195 through the pressure difference passage 192. Therefore, pressure in the third section chamber 195 is equal to suction pressure Ps. The first section chamber 193 and the second section chamber 194 are connected through a connecting passage 196 and the connecting passage 196 can be opened or closed by a valve body 197.

The valve body 197 is formed integrally with a differential pressure type actuating member 200 and a connecting bar 199. The differential pressure type actuating member 200 is biased to the left, as shown in FIG. 4, by a spring 198, thereby pushing the valve body 197 against a valve seat 197a to close the connecting passage 196. When the discharge pressure Pd in the first section chamber increases and a difference between the discharge pressure Pd and the suction pressure Ps in the third section chamber 195 increases, the pressure difference causes the differential pressure type actuating member 200 to move to the right, as shown in FIG. 4. Thus, the valve body 197 moves to the right in FIG. 4 and the valve seat 197a is open to the connecting passage 196.

The strength of the spring biasing force can be selected based upon an evaluation as to pressure difference level that is most appropriate for opening the connecting passage 196. This pressure difference level is preferably defined as an index for the abnormally high-pressure state of the discharge pressure Pd, such that the first section chamber 193 should be connected to the second section chamber 194 to release the refrigerant if this pressure difference level is reached.

A representative structure for releasing the refrigerant from the discharge chamber 120 into the driving chamber 110 during operation of the cooling circuit will now be described. As shown in FIG. 3, a cooling capacity control valve 140 is provided at a position within the cooling capacity changing passage 107. The cooling capacity control valve 140 may be a solenoid valve having a valve body 211 and a solenoid 213 and may allow the cooling capacity changing passage 107 to achieve a communicating state or a non-communicating state by either exciting or not exciting the solenoid 213 during operation of the cooling circuit. During operation of the heating circuit, the solenoid 213 is not excited, because the heating capacity changing passage 191 is utilized to change the output discharge capacity. Thus, the cooling capacity changing passage 107 is maintained in non-communicating state at all times. Opening/closing of the cooling capacity control valve 140 may be controlled by a control means (not shown).

This representative air conditioning system can be operated in the following manner. As described above, during operation of the cooling circuit 151 shown in FIG. 2, the high temperature, high pressure refrigerant is circulated to the compressor 101 again for recirculation through the capacitor 155, the first expansion valve 157, the heat exchanger 159 and the accumulator 161. During operation of the heating circuit 152, the high temperature, high pressure refrigerant is circulated to the compressor 101 again for recirculation through the second expansion valve 163, the heat exchanger 159 and the accumulator 161 on the bypass passage 152a.

During operation of the heating circuit 152, the heating capacity control valve 181 shown in FIG. 3 opens when the refrigerant discharge pressure increases excessively in order to open the heating capacity changing passage 191. Thus, the refrigerant from the discharge opening 121 will be introduced into the driving chamber 110. Consequently, the driving chamber pressure will increase and the output discharge capacity of the compressor 101 will decrease. The discharge pressure will also decrease and thus alleviate the abnormally high-pressure state of the discharge chamber.

On the other hand, if the pressure difference is small, i.e., when the discharge chamber is not in the abnormally high-pressure state, the heating capacity control valve 181 is closed so that the heating capacity changing passage 191 is in the non-communicating state. Therefore, the refrigerant is not released into the driving chamber 110.

The opening/closing operation of the heating capacity control valve 181 will be specifically described with reference to FIG. 4. During normal operation of the heating circuit, i.e. when the discharge pressure Pd is not in an abnormally high-pressure state, the discharge pressure Pd in the first section chamber 193 biases the differential pressure type actuating member 200 to the right as shown in FIG. 4. At the same time, the resultant of the suction pressure Ps in the third section chamber 195 and the biasing force of the spring 198 bias the differential pressure type actuating member 200 to the left, as shown in FIG. 4. During normal operation, rightward movement of the differential pressure type actuating member 200 is prevented and the differential pressure type actuating member 200 does not move. In this case, the valve body 197 formed integrally with the differential pressure actuating member 200 through the connecting bar 199 contacts the valve seat 197a and closes the connecting passage 196 which connects the first section chamber 193 and the second section chamber 194. As a result, the heating capacity control valve 181 is closed. Therefore, because the discharge opening 21 and the driving chamber 110 are not in communication with each other in the normal operating state, the refrigerant is not released from the discharge opening 121 into the driving chamber 110 and the output discharge capacity is not changed.

On the other hand, when driving input to the compressor 101 is increased, for example due to increase in engine speed (see FIG. 2), the workload of the compressor 101 increases and volume of the refrigerant forced into the heating circuit 152 per unit time increases. As a result this increase in output discharge capacity, the refrigerant discharge pressure may increase to exceed the desired steady-state pressure in some cases. During operation of the heating circuit 152, because the circuit operates by utilizing the relatively high discharge pressure as described above, the discharge pressure is liable to reach the upper pressure limit for the circuit even when the discharge pressure increases only slightly. Therefore, an abnormally high-pressure state can result. In particular, because a portion of the cooling circuit is utilized to form the hot-gas bypass heater circuit, the circuit volume is relatively small and the abnormally high-pressure state can be easily generated.

In this situation, the suction pressure does not increase in response to the increase in discharge pressure, but rather the discharge pressure also increases relative to the suction pressure for the following reason. When the output of the compressor 101 increases, naturally an increased volume of refrigerant is supplied from the compressor 101 to the heating circuit 152. Because a fixed amount of refrigerant is circulating through the heating circuit 152, a reduced amount of refrigerant is available to be drawn into the suction port S. Therefore, the discharge pressure Pd increases relative to the suction pressure Ps, because when the output of the compressor 101 increases, the difference between the discharge pressure and the suction pressure increases.

When the discharge pressure Pd of the refrigerant increases relative to the suction pressure Ps, an increased biasing force, which is caused by the discharge pressure Pd in the first section chamber 193, pushes against the differential pressure type actuating member 200 to the right, as shown in FIG. 4. If the resultant of the pressure Ps in the third section chamber and the biasing force of the spring 198 which biases the differential pressure type actuating member 200 to the left are less than the biasing force of discharge pressure Pd, the differential pressure type actuating member 200 will move to the right, as shown in FIG. 4. As a result, the valve body 197 which has been contacting the valve seat 197a moves to the right in FIG. 4 to open the connecting passage 196. At that time, the first section chamber 193 can communicate with the second section chamber 194. Therefore, when the discharge pressure Pd reaches an abnormally high-pressure state, refrigerant is released from the discharge opening 121 into the driving chamber 110 (see FIG. 2) through the connecting passage 196 and the second passage 191b. As a result, the pressure Pc in the driving chamber 110 will increase, the output discharge capacity of the compressor will decrease and the discharge pressure of the compressor 101 will also decrease to alleviate the abnormally high-pressure state.

In this case, although energy efficiency is slightly decreased, because the compressor 101 must release refrigerant at increased pressure into the driving chamber 110, the output discharge capacity is decreased by a small release amount and the discharge pressure is decreased, even if the refrigerant releasing operation is not continued thereafter. However, because the refrigerant is not discharged outside of the heating circuit 152, severe system energy losses are prevented and the heating circuit 152 can retain sufficient refrigerant to maintain the heating operation.

The refrigerant released into the driving chamber 110 is drawn into the cylinder bores 109 through the bleeding passage 105, the suction chamber 115, the suction port 118a and the suction valve 118 and the refrigerant is then compressed. After compression, the refrigerant is discharged through the discharge port 123a, the discharge valve 123, the discharge chamber 120 and the discharge opening 121 and is sent to the heating circuit 152 again.

The operation of the cooling circuit 151 (see FIG. 2) also will be described. The cooling capacity control valve 140 shown in FIG. 3 opens when refrigerant suction pressure is excessively low during operation of the cooling circuit 151 in order to open the cooling discharge capacity changing passage 107. Thus, refrigerant is introduced from the discharge chamber 120 into the driving chamber 110 to increase driving chamber pressure. By decreasing the output discharge capacity of the compressor 101, suction pressure is increased, thereby preventing frost from forming on the heat exchanger 159 (see FIG. 2), which may be caused when the suction pressure is excessively low.

A controller (not shown) may be provided to detect the refrigerant suction pressure and to generate a signal to open the cooling capacity control valve 140 in order to increase the suction pressure. For example, a control signal may be transmitted to excite the solenoid 213, move the valve body 211, and open the cooling capacity control valve 140 when the controller has sensed that the suction pressure is excessively low. In this manner, high-pressure refrigerant can be released from the discharge chamber 120 into the driving chamber 110 so as to decrease the output discharge capacity of the compressor 101. As a result, the suction pressure is increased and the formation of frost on the heat exchanger 159 can be prevented.

During operation of the heating circuit, because the discharge pressure is increased or decreased by the heating capacity control valve 181, the cooling capacity control valve 140 must be closed at all times. During operation of the cooling circuit, on the other hand, because the discharge pressure is increased or decreased by the cooling capacity control valve 140, the heating capacity control valve 181 must be closed at all times. However, the heating capacity control valve 181 has a structure in which the heating capacity control valve 181 is opened by the differences between the discharge pressure and the refrigerant suction pressure. It does not have a structure in which the heating capacity control valve 181 is actuated by an external signal, unlike the cooling capacity control valve 140. Therefore, the heating capacity control valve 181 may be opened when the discharge pressure is suddenly increased with respect to the suction pressure during operation of either the heating circuit or the cooling circuit. In other words, although the heating capacity control valve 181 must be closed during operation of the cooling circuit, the heating capacity control valve 181 may be opened accidentally by the difference between the discharge pressure and the suction pressure.

Unlike the heating circuit, the cooling circuit is not required to operate with the refrigerant in a maximum high pressure state. Thus, the discharge pressure is relatively low during operation of the cooling circuit as compared with the discharge pressure during operation of the heating circuit. Because a condition for opening the heating capacity control valve 181 is set on a side of the heating circuit which uses higher pressure as the steady-state discharge pressure, the problem of opening of the heating capacity control valve 181 in operation of the cooling circuit is less likely to occur.

Further, even if the heating capacity control valve 181 is opened during the operation of the cooling circuit, the opening of the valve only results the increasing of the suction pressure and thus such an opening of the valve does not adversely affect the cooling circuit operation.

In such an air conditioning system having a hot-gas bypass heater, reductions in heating performance due to the release of refrigerant from the heating circuit into the cooling circuit to alleviate an abnormally high-pressure state do not occur. Also, energy efficiency is not significantly decreased due to wasteful releasing of the refrigerant at highly increased pressure to outside the heating circuit.

Moreover, the refrigerant is not released from the discharge side to the suction side to decrease the discharge pressure by the direct action of such release. Instead, a small amount of refrigerant is released into the driving chamber to increase the driving chamber pressure, decrease the inclination angle of the swash plate, decrease the piston stroke length and decrease the output discharge capacity, thereby decreasing the discharge pressure. With this structure, wasted system energy required to alleviate the abnormally high-pressure state of the discharge pressure is reduced to a minimum.

As shown in FIG. 3, although the driving chamber 110 is connected to the suction chamber 115 through the bleeding passage 105, the refrigerant released from the discharge opening 121 builds up temporarily in the driving chamber 110 and is not released directly into the suction chamber 120. Therefore, the suction pressure Ps is prevented from increasing by being directly affected by release of the high-pressure refrigerant. As a result, a decreasing discharge pressure Pd can be maintained for a relatively long time. In this sense, by releasing the refrigerant into the driving chamber 110, the driving chamber 110 can be utilized as a reserve tank.

As shown in FIG. 4, release of the discharge pressure Pd is carried out based on the difference between the discharge pressure Pd and the suction pressure Ps. Because it is unnecessary to use an atmospheric pressure or a vacuum as a comparison reference for the difference in constructing of the air conditioning system, an airtight air conditioning system can be easily constructed.

Second Detailed Representative Embodiment

Figure 5:
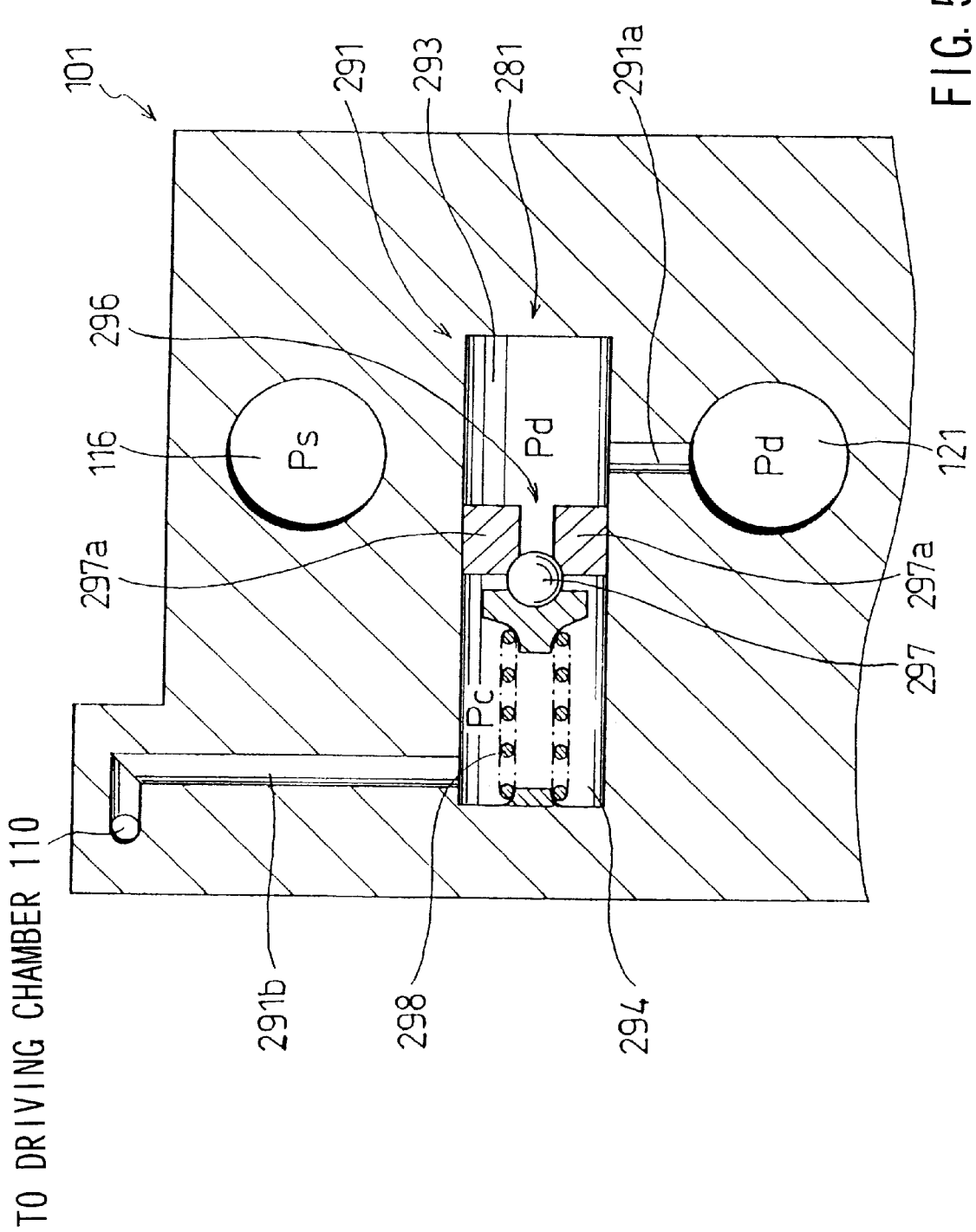
FIG. 5 shows a detailed structure of controller for an air conditioning system according to a second representative embodiment.

As shown in FIG. 5, a heating controller 291 and a heating capacity control valve 281 that is opened by a difference between the discharge pressure Pd and driving chamber pressure Pc are shown. In this embodiment, the discharge pressure is used as the high-pressure side and the driving chamber pressure Pc is used as the low-pressure side.

This representative embodiment further includes a first section chamber 293 and a second section chamber 294. The first section chamber 293 communicates with the discharge opening 121 through a first passage 291a. Therefore, pressure in the first section chamber 293 is equal to the discharge pressure Pd. The second section chamber 294 communicates with the driving chamber 110 through a second passage 291b. Therefore, pressure in the second section chamber 294 is equal to the driving chamber pressure Pc. The first section chamber 293 and the second section chamber 294 may be connected through a connecting passage 296 that is opened or closed by a valve body 297. The valve body 297 may be biased to the right by a spring 298, as shown in FIG. 5.

During normal operating conditions, i.e. the discharge pressure Pd of the refrigerant is not in the abnormally high-pressure state, the discharge pressure Pd in the first section chamber 293 biases the valve body 297 to the left, as shown in FIG. 5. At the same time, a resultant of the driving chamber pressure Pc in the second section chamber 294 and the biasing force of the spring 298 counteracts the leftward movement of the valve body 297. As a result, the valve body 297 preferably does not move during normal operating conditions. In this case, the valve body 297 contacts valve seat 297a and closes the connecting passage 296. Therefore, the discharge opening 121 and the driving chamber 110 do not communicate with each other during normal operating conditions.

On the other hand, when the discharge pressure Pd of the refrigerant becomes abnormally high, the discharge pressure force exceeds the resultant of the driving chamber pressure Pc in the second section chamber 294 and the biasing force of the spring 298. Therefore, the valve body 297 will move to the left, as shown in FIG. 5. The valve body 297 no longer contacts the valve seat 297a and the connecting passage 296 between the first section chamber 293 and the second section chamber 294 is opened to connect both chambers. In other words, the heating capacity control valve 281 is opened. Therefore, when the discharge pressure Pd of the refrigerant reaches an abnormally high-pressure state, refrigerant is released into the driving chamber 110 through the connecting passage 296, second section chamber 294 and the second passage 291b. As a result, the compressor output capacity decreases, the discharge pressure decreases and the abnormally high pressure of the discharge pressure can be alleviated.

A one-sided swash plate type of compressor, i.e., a compressor having pistons 135 disposed on only one side of the swash plate 130 in FIG. 3, is used as the variable displacement compressor in both of the first and second representative embodiments. However, a double-ended piston type can also be used in the variable displacement compressor, in which pistons are connected to opposite sides of the swash plate for reciprocation. Further, although the controller is disposed inside the compressor (i.e. within the housing), the controller also can be provided outside the compressor. Finally, although the air conditioning system was described as having both a cooling circuit and a heating circuit in the representative embodiments, the cooling circuit may be removed, because the present teachings are preferably utilized to alleviate high pressure states within a heating circuit.

Further, although it is not particularly shown in the drawings, following features may be preferably employed to any of the representative embodiments.

First, driving chamber decompression means that releases the refrigerant from the driving chamber 110 in FIG. 3 into the suction area (suction chamber 115, suction port 118a or suction opening 116) separately from the decompression passage 105 when the driving chamber 110 is brought into a predetermined high-pressure state. The driving chamber decompression means may preferably have a passage extending from the driving chamber 110 to the suction area and a driving chamber decompression valve provided on the passage. The driving chamber decompression valve is opened when the driving chamber is brought into the predetermined high-pressure state in order to release the high-pressure refrigerant from the driving chamber 110 to the suction area to thereby prevent the airtight seal of the driving chamber 110 from being degraded.

Second, means for releasing the refrigerant directly from the discharge area (discharge chamber 120 or discharge opening 121) into the suction area may preferably be provided. The refrigerant releasing means may preferably have a passage extending from the discharge area to the suction area and a refrigerant releasing valve provided on the passage. The refrigerant releasing valve is opened when the discharge pressure is extremely increased such that the normal control by decreasing the compressor discharge capacity can not alleviate the extreme increase in the discharge pressure. Therefore, such means can be utilized as an emergent releasing means for decreasing the abnormal high-pressure state of the refrigerant.

What is claimed is:

1. An air conditioning system comprising:
   a compressor having a driving chamber, a suction chamber, a discharge chamber, wherein compressed refrigerant may be released from the discharge chamber into the driving chamber to decrease the compressor output discharge capacity,
   a heating circuit having a heat exchanger and a passage extending from the discharge chamber to the suction chamber through the heat exchanger and
   a controller that detects differences in pressure between the discharge pressure at the discharge chamber and either a suction pressure at the suction chamber or a driving chamber pressure and causes refrigerant to be released from the discharge chamber into the driving chamber based upon increases in the detected pressure difference.

2. An air conditioning system according to claim 1, wherein the controller has a capacity changing passage extending from the discharge chamber to the driving chamber and a capacity control valve disposed within the capacity changing passage and the capacity control valve is opened by an increasing pressure difference between the discharge pressure and either the suction pressure or the driving chamber pressure.

3. An air conditioning system according to claim 2, wherein the capacity changing passage and the capacity control valve are disposed within a housing of the compressor.

4. An air conditioning system according to claim 1 further comprising a cooling circuit having a condenser disposed between the discharge chamber and the suction chamber, wherein the heat exchanger is disposed downstream from the condenser.

5. An air conditioning system according to claim 1 wherein the compressor further comprises:
   a swash plate connected to a driving shaft disposed within the driving chamber, the swash plate rotating together with the driving shaft at an inclination angle with respect to a plane perpendicular to the driving shaft and
   a piston disposed in a cylinder bore, an end portion of the piston connected to a peripheral edge of the swash plate by means of a shoe, the piston reciprocating in the cylinder bore to compress the refrigerant in response to rotation of the swash plate in the driving chamber of the compressor.

6. A method of using an air condition system comprised of a compressor having a driving chamber, a suction chamber, a discharge chamber, wherein compressed refrigerant may be released from the discharge chamber into the driving chamber to decrease the compressor output discharge capacity, a heating circuit having a heat exchanger and a passage extending from the discharge chamber to the suction chamber through the heat exchanger and a controller that detects differences in pressure between the discharge pressure at the discharge chamber and either a suction pressure at the suction chamber or a driving chamber pressure and causes refrigerant to be released from the discharge chamber into the driving chamber based upon increases in the detected pressure difference, said method comprising the steps of:

detecting the pressure difference between the discharge pressure and either the suction pressure or the driving chamber pressure and releasing refrigerant from the compressor discharge chamber into the compressor driving chamber when the pressure difference increases.

7. A method according to claim 6, wherein the refrigerant is released from the discharge chamber into the driving chamber by a capacity control valve, which is opened by an increasing pressure difference between the compressor discharge pressure and either the suction pressure or the driving chamber pressure.

8. A method for controlling refrigerant discharge pressure in an air conditioning system comprising the steps of:

detecting a pressure difference between a compressor discharge pressure and either a compressor suction pressure or a compressor driving chamber pressure and releasing refrigerant from a compressor discharge chamber into a compressor driving chamber when the pressure difference increases.

9. A method according to claim 8, wherein the refrigerant is released from the compressor discharge chamber into the compressor driving chamber by a capacity control valve opened by an increasing pressure difference between the compressor discharge pressure and either the compressor suction pressure or the compressor driving chamber pressure.

* * * * *